United States Patent
Ficarra et al.

(10) Patent No.: US 11,487,738 B1
(45) Date of Patent: Nov. 1, 2022

(54) REPLICA PERFORMANCE FOR TRANSACTIONS SUBMITTED TO LOG-FIRST DISTRIBUTED DATABASES

(71) Applicant: Amazon Technologies, Inc., Seattle, WA (US)

(72) Inventors: Michele Ficarra, Dublin (IE); Gary Taylor, Dublin (IE); Shane Stacey, Dublin (IE); Carlo Bergonzini, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 484 days.

(21) Appl. No.: 16/450,755

(22) Filed: Jun. 24, 2019

(51) Int. Cl.
*G06F 16/23* (2019.01)
*G06F 9/46* (2006.01)
*G06F 16/27* (2019.01)

(52) U.S. Cl.
CPC .......... *G06F 16/2358* (2019.01); *G06F 9/466* (2013.01); *G06F 16/27* (2019.01)

(58) Field of Classification Search
None
See application file for complete search history.

(56) References Cited

U.S. PATENT DOCUMENTS

| 7,991,745 | B2 | 8/2011 | Bourbonnais et al. |
| 2009/0049107 | A1 | 2/2009 | Yamaguchi et al. |
| 2012/0054533 | A1* | 3/2012 | Shi ...................... G06F 11/2097 714/4.1 |
| 2016/0232178 | A1* | 8/2016 | Little ...................... G06F 11/14 |
| 2017/0118237 | A1* | 4/2017 | Devi Reddy ....... H04L 63/1425 |
| 2017/0286516 | A1* | 10/2017 | Horowitz ............ G06F 11/3006 |
| 2018/0246928 | A1* | 8/2018 | Kim .................... G06F 11/1474 |
| 2019/0286627 | A1* | 9/2019 | Cadarette .............. G06F 16/122 |

* cited by examiner

Primary Examiner — Eddy Cheung
(74) Attorney, Agent, or Firm — Robert C. Kowert; Kowert, Hood, Munyon, Rankin & Goetzel, P.C.

(57) ABSTRACT

By obtaining metadata for transactions submitted by a service to a log-first distributed database of a provider network, a metrics manager may determine database replica performance for those transactions and notify clients of potential performance issues. When an instance of the service submits a write transaction to the log-first distributed database, the transaction may include a host name and a timestamp for the submission of the transaction. At a later point in time, a write applier may obtain the transaction and apply it to a local database replica, along with an additional timestamp for the application of the transaction to the replica. A metrics manager may obtain the transaction timestamps from the replica and calculate a latency metric for the propagation of the transaction from the particular service instance/instance host to the replica. The latency metric may be stored or transmitted to an endpoint (e.g., a client or administrator).

20 Claims, 9 Drawing Sheets

REPLICA PERFORMANCE FOR TRANSACTIONS SUBMITTED TO LOG-FIRST DISTRIBUTED DATABASES

BACKGROUND

In recent years, a larger number of computing applications are being implemented in distributed environments. A given distributed application may utilize numerous physical and/or virtualized servers spread among multiple servers within one or more data centers of a provider network, and may serve many different customers. In many cases, an application may use multiple database replicas and/or transaction logs in order to provide better data reliability in the event of database failures or other events that may negatively impact data reliability.

As the number of servers used for a given application increases and as the complexity of the application's network increases, adverse performance issues may be encountered at higher rates. For example, failure events of various types (e.g., failures of processes or servers, substantial delays in network message latency, loss of connectivity between pairs of servers) are inevitably encountered at higher rates. Due to the distributed nature of a given application, it may be difficult to pinpoint why the application begins to suffer a degradation in performance. Furthermore, it may be difficult to monitor the application and to discover the source of the performance issues without introducing additional issues that further impact the performance of the application.

Figure 1:
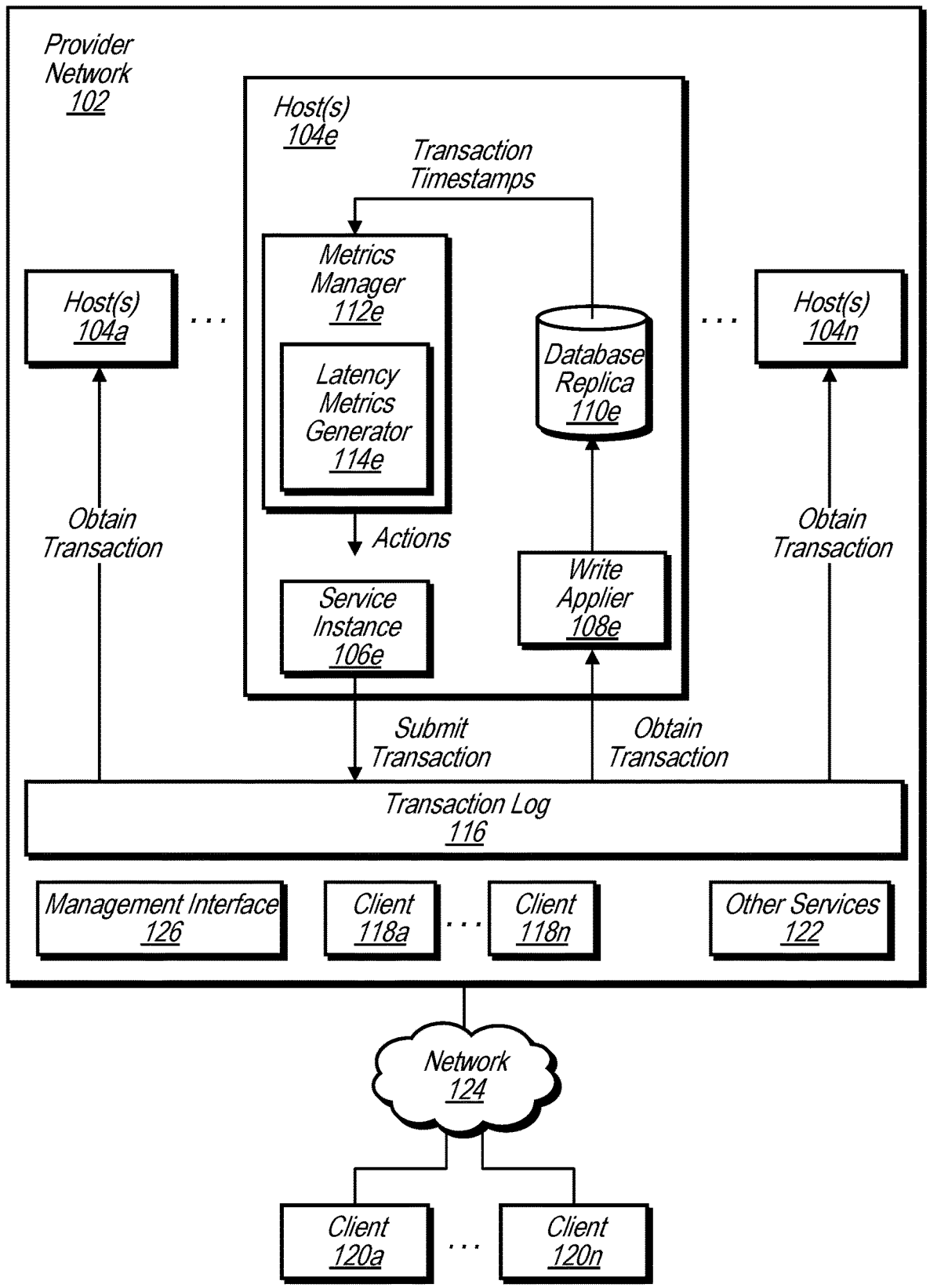
FIG. 1 illustrates a system for determining replica performance for transactions submitted by service instances to a log-first distributed database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for determining database replica performance for transactions submitted by service instances to a log-first distributed database. In embodiments, one or more actions may be performed in response to determining the performance/performance metric associated with a database replica is below a desired performance/value. For example, the performance metric (e.g., replica latency) may be stored and/or transmitted, a notification of the performance metric may be sent to a client or other endpoint, or resources may be scaled up to increase performance. In embodiments, the service instances may be instances for any type of service that uses a log-first distributed database for transactions and/or state changes.

In embodiments, a database replica may be any type of data store that is capable of storing data (e.g., transaction data and/or state changes) for a log-first distributed database. For example, the database replica may store data included in a write transaction that was submitted by a service instance to the database and/or store metadata associated with the write transaction (e.g., a time for submission of the write transaction to a transaction log of the database, a time of applying the write transaction to the database replica, etc.).

Various embodiments provide the ability to determine replica performance for transactions submitted by service instances to a log-first distributed database with minimal or no impact to performance of the database and/or the service itself (e.g., consuming a minimal amount of network bandwidth and/or computing resources compared to other techniques that require additional monitoring software and/or hardware). For example, a series of small "monitoring" or "test" write transactions may be submitted be each service instance at periodic intervals (e.g., as "heartbeat" transactions) and/or at any other point in time (e.g., in response to triggering events or at least partially random basis). A "submit" timestamp may be included as part of the test transactions.

At a later point in time, an applier may obtain a given test transaction and apply it (along with an "arrive" timestamp) to a database replica associated with the write applier. A metrics generator may obtain the timestamps for the test transaction and determine a latency metric for the transaction (e.g., "replica latency" due to propagation time of the transaction to the replica). The metrics generator may perform one or more actions if the latency metric becomes too high (e.g., exceeds an acceptable latency). For example, a host of the database replica may be at least temporarily removed from the distributed database and/or replaced by another host/database replica if the latency is too high. In some cases, a notification may be sent to a client of the service and/or another endpoint to indicate the latency of the transaction.

FIG. 1 illustrates a system for determining replica performance for transactions submitted by service instances to a log-first distributed database, according to some embodiments. In embodiments, the provider network 102, the hosts 104, and/or any other components depicted in FIG. 1 may be the same as or include one or more of the same components as the provider network, hosts, and/or any other components depicted in any of FIGS. 1-6. A host may be any type of one or more computing devices (servers or other computing devices) capable of hosting and/or executing one or more services or other types of applications. FIG. 7 depicts an example computer system(s) that may serve as a host.

In embodiments, a service provider's network 102 may include any number of hosts 104 (e.g., host computing device, such as a server) that implement any number of service instances 106 of a service. In some embodiments, the number of instances of a service may be increased or decreased, depending on the volume of work that the service needs to perform for a client. For example, if a client begins to submit requests to a compute instance to process a large quantity of data (e.g., perform calculations, image processing, etc.), then the service may instantiate one or more new compute instances to handle the surge in data.

Figure 3A:
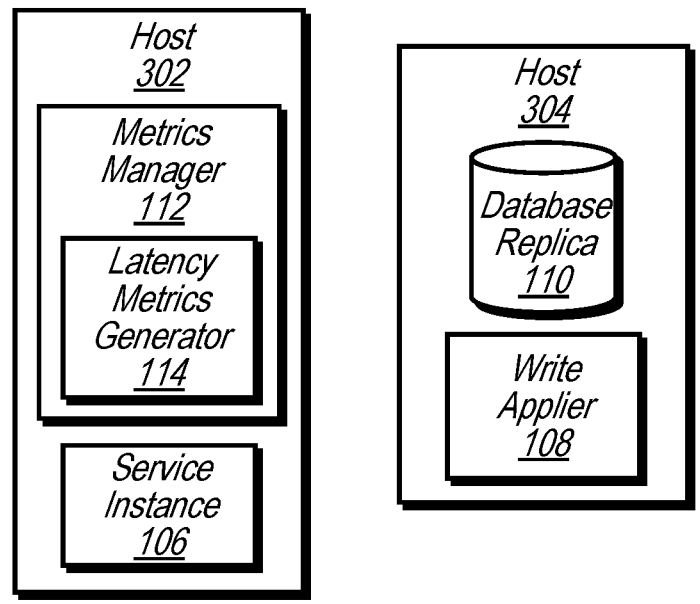
FIG. 3A illustrates a host configuration of a system for determining replica performance for transactions submitted to a log-first distributed database, according to some embodiments.
Figure 3B:
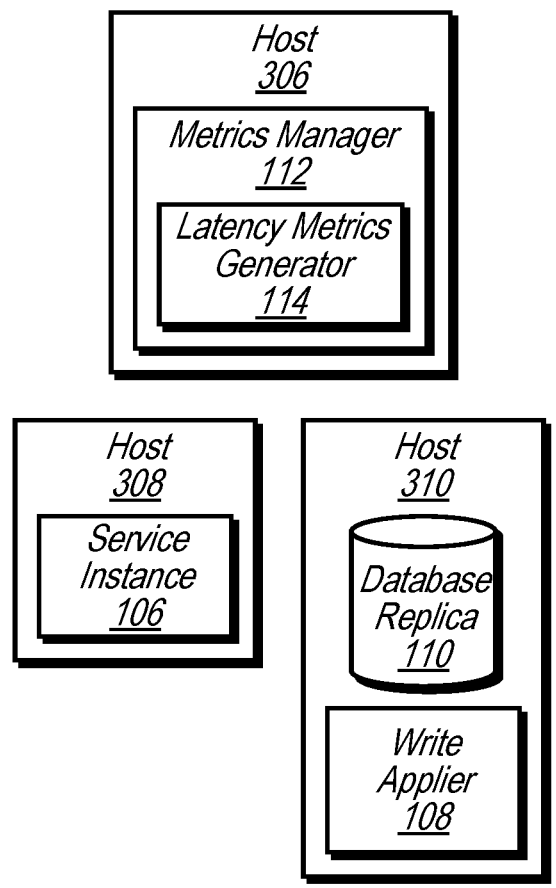
FIG. 3B illustrates another host configuration of a system for determining replica performance for transactions submitted to a log-first distributed database, according to some embodiments.

In the illustrative embodiment, the hosts 104 may each include service instance 106, a write applier 108 and associated database replica 110, and a metrics manager 112. For example, a single host 104e may include the service instance 106e, write applier 108e, replica 110e, and metrics manager 112e. Thus, each of those components are associated with each other as a group hosted by the same host 104e. However, in various embodiments, different components of the group may be hosted by different hosts. For example, FIGS. 3A and 3B show examples of different host configurations. As depicted, the metrics manager 112e includes a latency metrics generator 114, which may calculate latency for propagating transactions to the replica 110 (e.g., based on transaction timestamps obtained from the replica).

In embodiments, the metrics manager 112e may be assigned to obtain data from the replica 110e and/or assigned to generate metrics for transactions submitted by service instance 106e, regardless of whether or not the metrics manager 112e is hosted by the same host 104e. Thus, the replica 110e may be the only replica that the metrics manager 112e obtains data from and/or transaction data for the service instance 106e may be the only transactions that the metrics manager 112e generates metrics for. In other embodiments, a particular metrics manager may obtain data from two or more different replicas and/or generate metrics for transactions submitted by two or more different service instances.

Figure 2:
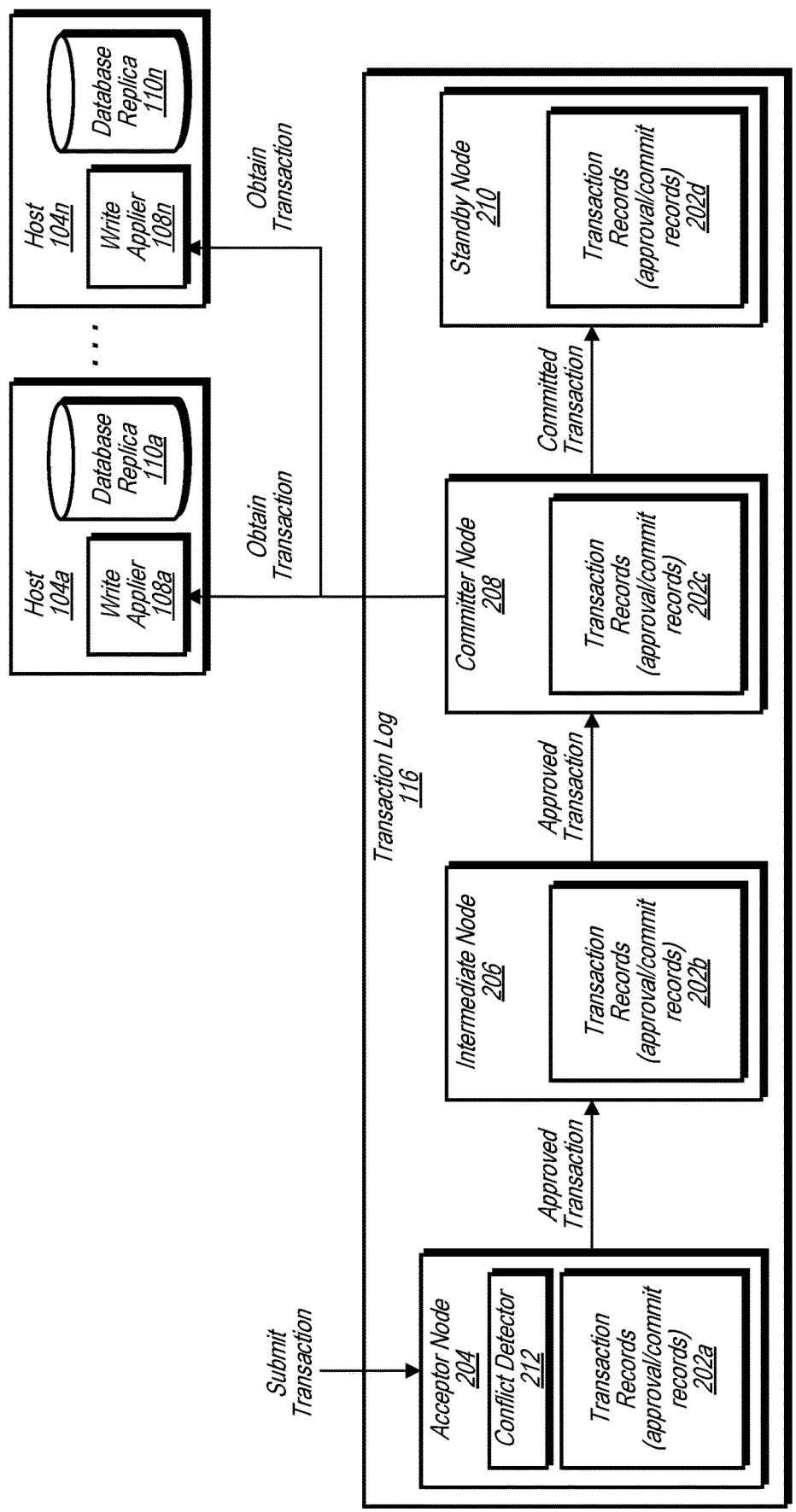
FIG. 2 illustrates a log-first distributed database with a transaction log that includes multiple nodes, according to some embodiments.

As shown, each service instance may submit database transactions (e.g., write, read, etc.) to a transaction log 116 of a log-first distributed database. FIG. 2 describes an example implementation of a transaction log. In the depicted embodiment, the log-first distributed database may include the transaction log 116 as well as each of the write appliers 108 and associated replicas 110 that are hosted by the hosts 104. After a service instance (e.g., service instance 106e) submits a transaction to the transaction log 116, a write applier (e.g., write applier 108e) may obtain the transaction from the transaction log and apply it to the associated replica (e.g., replica 110).

In embodiments, the service instance may include and identifier of the service instance and/or a timestamp that indicates a time for the submission of the write transaction by the service instance to the transaction log (e.g., "submit" timestamp). A certain amount of time may be required for the transaction log to process the submitted transaction (e.g., check for transaction conflicts, log the transaction, propagate the transaction to different nodes, etc.) before the transaction is available to be obtained by the write applier and applied to the replica. Due to this processing time, a latency is introduced between the submission of the transaction and the application of the transaction to the replica. Therefore, an "arrive" timestamp may be added to the write transaction when it is applied to the replica (e.g., by the write applier and/or by a database trigger).

In some embodiments, the time for the submit timestamp and the arrive timestamp are based on the local system time or logical time for the local instance host. Therefore, latencies that are measured for transactions that are submitted by and obtained by the same instance host are accurate, even though the time used by the instance host may or may not be in synch with the time used by one or more other instance hosts. In embodiments, this built-in time accuracy can be taken advantage of by having different instances and associated database replicas hosted by the same instance host. In some embodiments, each of the instance hosts keeps track of time based on a global or shared time source. In such embodiments, each of the times indicated by the timestamps for different instances/instance hosts are synced to the same time or approximately the same time.

At some point in time after the write transaction is applied to the replica, the metrics manager (e.g., metrics manager 112e) may obtain (e.g., based on the identifier of the service instance), the submit timestamp and/or the arrive timestamp from the database replica. The metrics manager may then calculate a latency metric associated with the replica (e.g., replica 110e) and the transaction log based on the submit timestamp and/or the arrive timestamp. For example, the metrics manager may calculate the delay between submission of the transaction by the service instance to application of the transaction to the replica (e.g., the "replica latency" of the replica relative to the submission of the transaction to the transaction log).

In embodiments, the metrics generator may perform one or more actions in response to calculating the replica latency. For example, if the latency metric exceeds a threshold latency (e.g., exceeds a maximum acceptable latency time), then the host of the database replica may be at least temporarily removed from the distributed database (e.g., taken offline) and/or replaced by another host/database replica.

In some cases, a notification may be sent to a client of the service and/or another endpoint to indicate the latency of the transaction (e.g., indicate that the latency metric exceeds a maximum acceptable threshold latency time). For example, a notification may be sent to an internal client of the service (e.g., client 118 within the provider network) or to a remote external client of the service (e.g., client 120 external to the provider network). In some instances, a notification may be sent to another service 122 of the provider network. In embodiments, the other service performs one or more of the responsive actions.

In embodiments, any number of external clients 120 may use any of the services of the provider network 102 by communicating with the provider network 102 via a wide area network 124 (e.g., the internet). As shown, a client of the service may configure the service (e.g., service instances assigned to the client) and/or configure the log-first distributed database (e.g., assigned to the client for use by the service instances) by submitting configuration requests via a management interface 126 (e.g., application programming interfaces) of the provider network. In embodiments, the management interface 126 may be hosted by one or more of the hosts 104 or by a different host.

In various embodiments, the client may specify, via the management interface 126, various configuration parameters for the service and/or the log-first distributed database. For example, the client may specify the threshold latency for the replicas. In embodiments, the client may specify one or more actions for the service and/or other services to perform in response to exceeding the threshold latency for one or more replicas (e.g., send a notification to the client, adding additional database replicas/instance hosts, replacing instance hosts or replicas, switching to a different type of transaction log that uses faster and/or fewer replication nodes to reduce propagation delay, etc.).

FIG. 2 illustrates a log-first distributed database with an example implementation of a transaction log that includes multiple nodes, according to some embodiments. In various embodiments, any other suitable transaction log may be used in a similar manner to process transactions submitted to a log-first distributed database and to provide committed transactions to write appliers for application to data stores. Regardless of the type of transaction log used, a certain amount of propagation delay will typically be introduced from the time a given transaction is submitted to the transaction log from a client and the time that the given transaction is applied to a corresponding data store (e.g., database replica 110).

In the depicted embodiment, the application state transitions managed by the transaction log 116 correspond to transactions requested by transaction log client (e.g., service instances 106 of a service or an application) that includes reads and/or writes directed to a set of data stores (e.g., replicas 110). In embodiments, the state of the service may be modeled as a respective set of transaction records 202 stored in local storage at acceptor node 204, intermediate node 206, committer node 208 and standby node 210, with a current replication path comprising nodes 204, 206 and 208. In some implementations, separate transaction records for approval (i.e., indicating that the requested transaction has been approved for commit) and commit may be stored, while in other embodiments, a single transaction record may be stored with a field that indicates whether the transaction has been committed or not. A sequence number or logical timestamp may be stored as part of, or indicated by, at least some of the transaction records in the depicted embodiment.

The decision as to whether a submitted transaction is to be approved for commit may be made by a conflict detector 212 implemented at the acceptor node 204 in the depicted embodiment, although in other embodiments the conflict detector may be implemented at other nodes of the transaction log 116 or a node external to the transaction log 116. In some embodiments, a fault-tolerant log configuration manager may send configuration change messages asynchronously to the different nodes of the transaction log, with each such message indicating a change to the transaction log configuration, and without requiring the nodes to pause processing the stream of incoming transaction requests submitted by a client. In the depicted embodiment, the committer node 208 may transmit messages indicating commits to the acceptor node 204 and one or more intermediate nodes 206 as well as to the standby node 210. Write appliers 108, shown in as entities outside of the transaction log (e.g., hosted by hosts 104), may propagate writes from various committed transaction records to the appropriate data base replicas 110 and/or other data consumers. In other embodiments, the write appliers may be implemented within the transaction log, e.g., as respective processes running within one or more transaction log nodes. In some implementations, only a subset of the nodes (one or more nodes but less than all of the nodes) may be read by the write appliers in order to propagate committed writes to their destination replicas.

In some implementations, a transaction log may include one or more acceptor nodes, one or more committer nodes, zero or more intermediary nodes each positioned along a replication pathway comprising edges leading from an acceptor node to a committer node, and zero or more standby nodes that are configured to quickly take over responsibilities of one of the other types of nodes in the event of a node failure. In some embodiments, acceptor nodes may also be referred to as "head" nodes of the transaction log, and committer nodes may also be referred to as "tail" nodes.

In general, in at least some embodiments, each node of a particular transaction log may be responsible for replicating state information of at least a particular service or application, e.g., in the form of state transition records written to a local disk or other similar storage device. Application state information may be propagated along a set of edges from an acceptor node to a committer node of the transaction log, referred to herein as a replication pathway or a commit pathway. Each state transition message propagated within the transaction log may include a respective sequence number or a logical timestamp that is indicative of an order in which the corresponding state transition request was processed (e.g., at an acceptor node). When a particular state transition record reaches a committer node, e.g., after a sufficient number of replicas of the state transition record have been saved along a replication pathway, the transition may be explicitly or implicitly committed. The state of the application as of a point in time may be determined in some embodiments as a logical accumulation of the results of all the committed state transitions up to a selected sequence number. A configuration manager may be responsible for managing changes to transaction log configuration (e.g. when nodes leave the transaction log due to failures, or join/re-join the transaction log) by propagating configuration change messages asynchronously to the transaction log nodes.

In some embodiments, an acceptor node may be responsible for receiving application state transition requests from a client of the replication transaction log, determining whether a particular requested transition should be accepted for eventual commit, storing a local replica of an accepted state transition record, and transmitting accepted state transition records to a neighbor node along a replication pathway of the transaction log towards a committer node. Depending on the use case, a state transition record may include a write payload in some embodiments: e.g., if the service/application state comprises the contents of a database, a state transition record may include the bytes that are written during a transaction corresponding to the state transition. The acceptor node may also be responsible in at least some embodiments for determining or generating the sequence number for an accepted state transition.

An intermediary node may be responsible for storing a local replica of the accepted state transition record, and transmitting/forwarding a message indicating the accepted state transition to the next node along the pathway to a committer node. The committer node may store its own replica of the state transition record on local storage, e.g., with an indication that the record has been committed. In some embodiments, and depending on the needs of the application, the committer node may initiate transmission of a commit response (e.g., via the acceptor node) to the client that requested the state transition. In at least one embodiment, the committer node may notify some or all of the nodes along the replication pathway that the state transition has been committed.

In some embodiments, when an indication of a commit is received at a transaction log node, the accept record for the now-committed state transition may be replaced by a corresponding commit record, or modified such that it now represents a commit record. In other embodiments, a given node may store both an accept record and a commit record for the same state transition, e.g., with respective sequence numbers. In some implementations, separate commit record sets and accept record sets may be stored in local storage at various nodes, while in other implementations, only one type of record (accept or commit) may be stored at a time for a given state transition at a given node.

FIG. 3A illustrates a host configuration of a system for determining replica performance for transactions submitted to a log-first distributed database, according to some embodiments. In embodiments, the configuration of hosts 302, 304 may be an example of at least some of the configurations of the hosts 104 of FIG. 1.

As depicted, one host 302 hosts the metrics manager 112 and one of the service instances 106 and another host 304 hosts one of the database replicas 110 and the associated write applier 108. In some embodiments, the host 302 may host one or more additional service instances for the same service and/or other services.

FIG. 3B illustrates another host configuration of a system for determining replica performance for transactions submitted to a log-first distributed database, according to some embodiments. In embodiments, the configuration of hosts 306, 308, 310 may be an example of at least some of the configurations of the hosts 104 of FIG. 1.

As depicted, one host 306 hosts the metrics manager 112, and another host 308 hosts one of the service instances 106, and another host 310 hosts one of the database replicas 110 and the associated write applier 108. In some embodiments, the host 308 may host one or more additional service instances for the same service and/or other services.

Figure 4A:
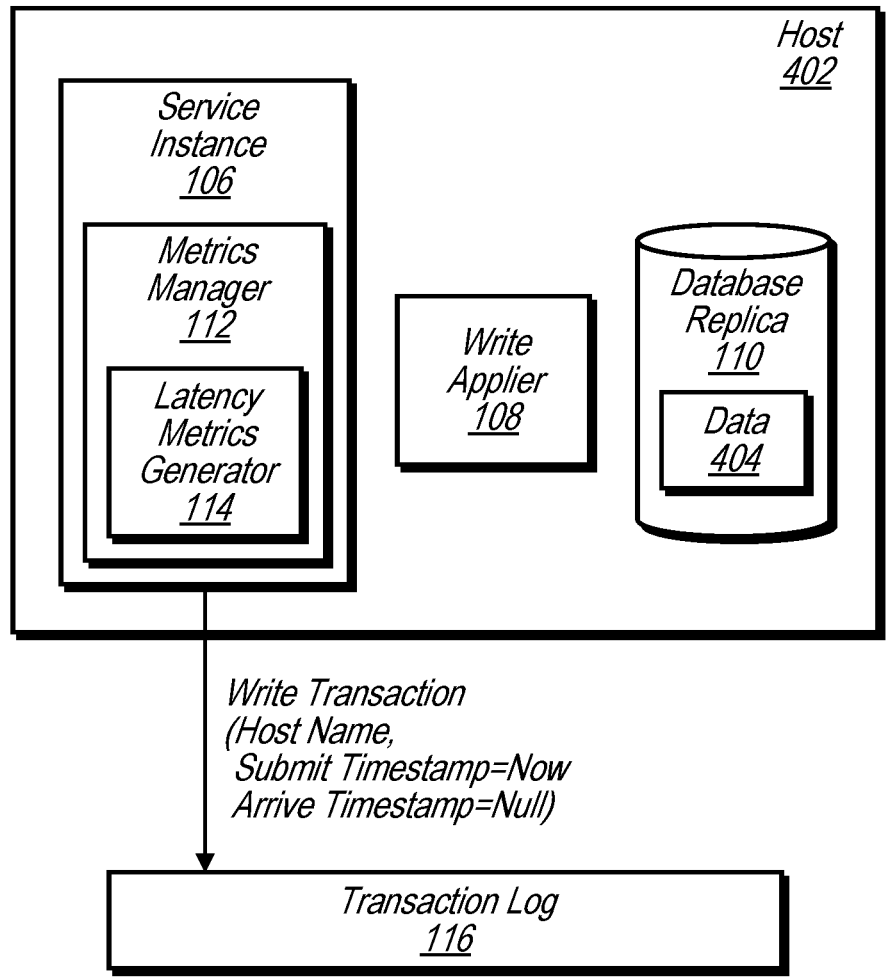
FIG. 4A illustrates a service instance submitting a write transaction to a transaction log of a log-first distributed database, according to some embodiments.
Figure 4B:
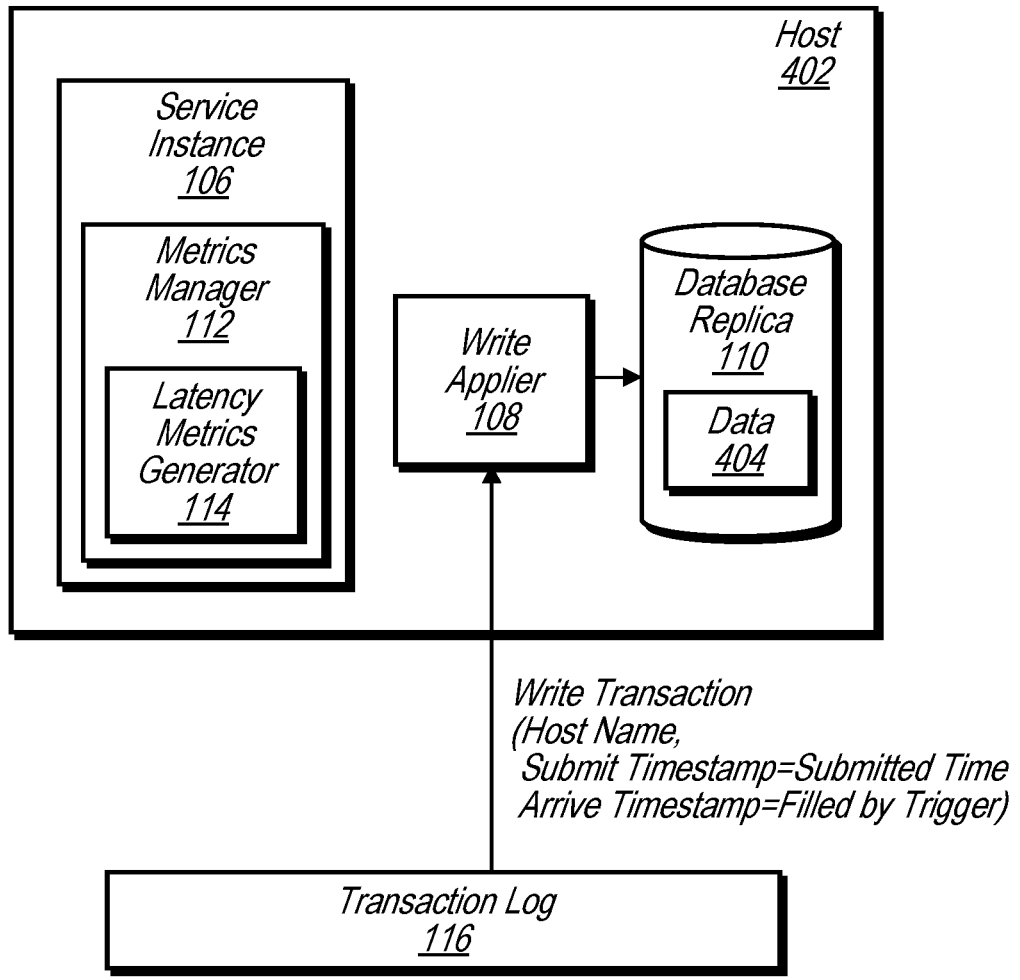
FIG. 4B illustrates a write applier obtaining the write transaction from the transaction log and applying the write transaction to a database replica, according to some embodiments.
Figure 4C:
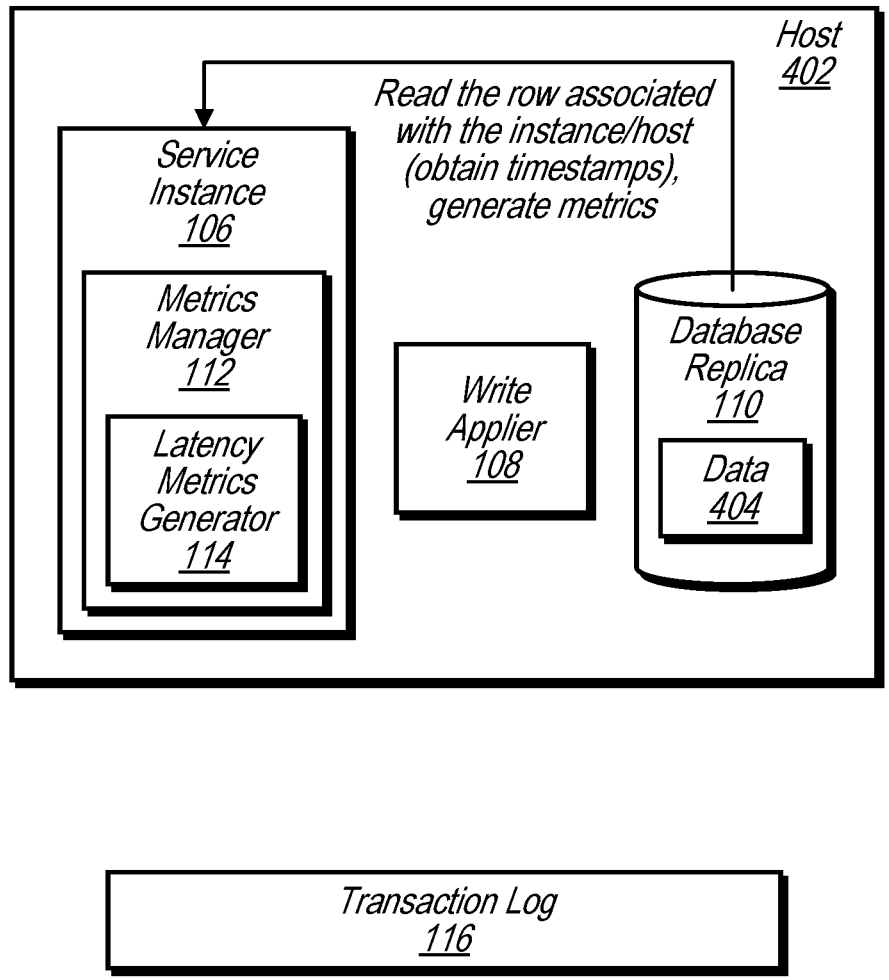
FIG. 4C illustrates a metrics manager obtaining timestamps for the write transaction to generate metrics based on the timestamps, according to some embodiments.

FIGS. 4A-4C illustrate actions that may be performed by an example host 402 and transaction log 116 of a log-first distributed database to process a given write transaction. In embodiments, the configuration of the host 402 may be an example of at least some of the configurations of the hosts 104 of FIG. 1.

FIG. 4A illustrates a service instance submitting a write transaction (e.g., a test transaction) to a transaction log of a log-first distributed database, according to some embodiments. As depicted, the same host 402 hosts one (or more) of the service instances 106, one of the database replicas 110 and the associated write applier 108, and the metrics manager 112.

As described herein, the data 404 stored by the database replica 110 may include transaction data and/or associated metadata for transactions submitted by the service instance 106 (and/or for transaction submitted by one or more other service instances of the service). As shown, the service instance 106 also hosts the metrics manager 112. In embodiments, the configuration of the host 402 is an example of the configuration of hosts that implement the alarm service of FIG. 5.

In embodiments, the service instance 106 submits a write transaction to the log-first distributed database (e.g., to the transaction log). In some embodiments, one or more other components/nodes of the log-first distributed database may process the submitted transaction before submitting it to the transaction log. For example, a conflict detector may verify that there are no errors and/or conflicts introduced by the submitted transaction.

As shown, the write transaction specifies a host name (e.g., an identifier for the service instance 106 and/or the host 402 that uniquely identifies the service instance 106 and/or the host 402 with respect to other service instances and/or hosts). The write transaction also specifies a submit timestamp that indicates a time for the submission of the write transaction by the service instance. For example, the service instance 106 may determine a time or approximate time for the submission of the transaction and add that determined time to the write transaction as a submit timestamp. As shown, an arrive timestamp field for the transaction is currently set to "null" (e.g., no value has been saved to the field).

FIG. 4B illustrates a write applier obtaining the write transaction from the transaction log and applying the write transaction to a database replica, according to some embodiments. In embodiments, the write applier 108 obtains the write transaction from the log-first distributed database (e.g., from the transaction log). In embodiments, one or more other write appliers associated with other database replicas at other hosts 402 may also obtain the write transaction in parallel and/or at substantially the same time (e.g., to allow for multiple replicas of the transaction to be stored at the respective replicas).

As shown, a database trigger for the replica may insert a value for the arrive timestamp field before and/or during application of the write transaction to the replica. In some embodiments, the write applier and/or the transaction log may insert the value. In embodiments, the arrive timestamp indicates a time for the application of the write transaction to the database replica. For example, the host (e.g., database trigger for the replica) may determine a time or approximate time for the application of the transaction to the replica and add that determined time to the write transaction as an arrive timestamp. The application of the write transaction may cause a new record and/or row to be added to the replica that specifies the host name, the submitted time (e.g., submit timestamp), the time the transaction was applied (e.g., arrive timestamp), and/or other metadata for the transaction.

FIG. 4C illustrates a metrics manager obtaining timestamps for the write transaction to generate metrics based on the timestamps, according to some embodiments. As shown, the metrics manager of the service instance may, at some point in time after the row is stored to the replica, query/read the row (e.g., identifying the row based on the host name and/or timestamp values that are new/most recent for the host name).

In embodiments, the metrics manager may read/query the replica for the row (e.g., most recently added row for the particular instance/host) at periodic intervals (e.g., once a second) and/or at any other point in time (e.g., in response to triggering events or at least partially random basis). In embodiments, the metrics manager may query the replica for the row at the same frequency or approximately the same frequency that the service instance submits the test transactions to the log-first distributed database.

The metrics manager may then calculate a latency metric associated with the database replica and the transaction log based on one or more of the timestamp or the other timestamp. For example, the metrics manager may determine the latency metric by calculating a difference between the time indicated by the arrive timestamp and the time indicated by the submit timestamp (e.g., the time required to propagate the transaction from the service instance to the database replica). In embodiments, the metrics manager may determine another latency metric by calculating a difference between a current time and the time indicated by the submit timestamp (e.g., the delay between the transaction submission time and the current time).

In some embodiments, a metrics manager calculates latency metrics for other transactions submitted by one or more other instances of the service hosted by other instance hosts in the same way as described above. For example, the metrics manager may obtain host names, submit timestamps, and/or arrive timestamps for one or more other instances of the service. In embodiments, the time indicated by the timestamp for another instance may be modified to account for a difference between a reading of a global or shared clock used by the instance host and a reading of the global or shared clock used by the other host (e.g., due at least in part to clock skew between the instance host and the other instance host and/or any other causes of differences of clock readings between the instance hosts). The metrics manager may store the latency metrics for other transactions and/or transmit them to an endpoint (e.g., a client and/or administrator).

In embodiments, the metrics manager may calculate a number of the instance hosts of the service that are healthy and send that number to an endpoint (e.g., a client and/or administrator). For example, the metrics manager may calculate the number of healthy hosts by determining how many hosts have one or more most recent latency metrics that are within a threshold latency or how many hosts have submitted a most recent test transaction (e.g., last heartbeat transaction) within a most recent period of time (e.g., the last 5 minutes, etc.).

In some embodiments, the metrics manager may obtain a latency metric for the database replica for the instance host (e.g., most recent metric) and may also obtain one or more other latency metrics (e.g., most recent) for one or more other respective database replicas (e.g., hosted at other hosts/instance hosts) and the transaction log. The metrics manager may compare the latency metric for the database replica to the one or more other latency metrics for the other database replicas. The metrics manager may then determine, based on the comparison, that the latency metric for the database replica exceeds an acceptable threshold latency. For example, the metrics manager may determine that the latency metric is at least a threshold amount larger than an average or median latency of the other database replicas (e.g., a certain amount of time or a certain number of standard deviations above the average or median). In response, the metrics manager may transmit to an endpoint an indication that the latency metric for the database replica exceeds an acceptable threshold latency (one or more actions may be performed, such as disabling the database replica or replacement of the database replica).

In various embodiments, the metrics manager may obtain a series of latency metrics over a period of time and determine, based on an amount of change in the latency metric over a period of time, to transmit to an endpoint an indication of the change in the latency metric. For example, the metrics manager may determine that the amount of change over a period of time (e.g., 1 minute, 1 hour, etc.), that the amount of change over the period of time exceeds a threshold amount of acceptable change for that period of time. In response, the metrics manager may transmit to an endpoint an indication that the amount of change over the period of time exceeds the threshold amount of acceptable change for that period of time (one or more actions may be performed, such as disabling the database replica or replacement of the database replica).

In embodiments, one metrics manager may by assigned to two or more (or all) of the replicas. For example, a particular metrics manager may obtain data from some or all of the replicas, calculate one or more metrics for different transactions submitted by different instance hosts, and perform one or more of the actions described herein based on those calculations (e.g., send notifications, scale resources, etc.). Thus, in various embodiments, any number of metrics managers may be assigned process data from any number of replicas and/or for any number of instances/instance hosts.

Figure 5:
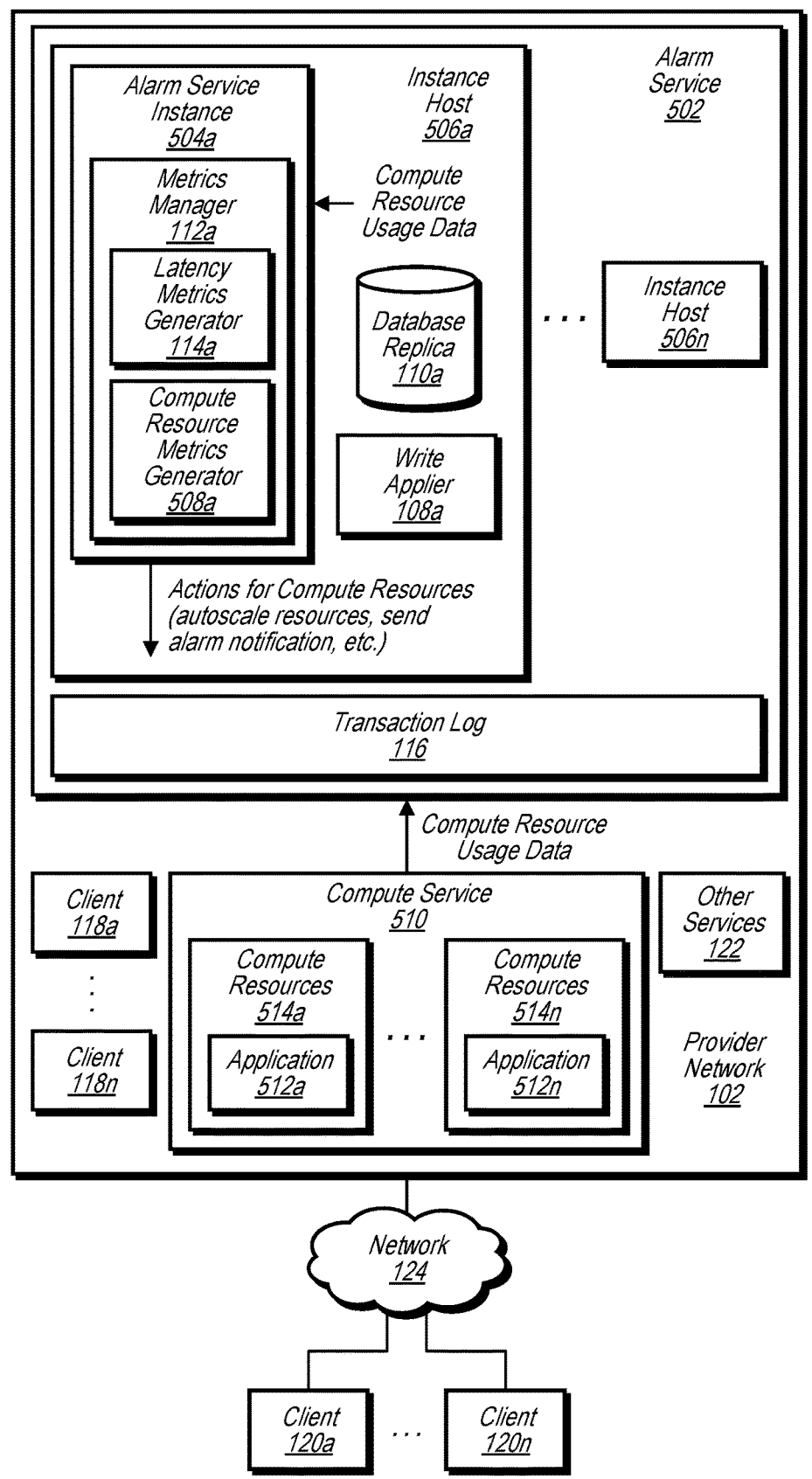
FIG. 5 illustrates a system for determining replica performance for transactions submitted by instances of an alarm service to a log-first distributed database, according to some embodiments.

FIG. 5 illustrates a system for determining replica performance for transactions submitted by instances of an alarm service to a log-first distributed database, according to some embodiments. The alarm service may be an example implementation of the service and log-first database of FIG. 1. Therefore, the hosts and various other components of FIG. 5 may include the same or similar components as the hosts and other components of FIG. 1.

As shown, an alarm service 502 may be implemented by one or more instances 504 that are each hosted by a different host 506. In addition to the latency metrics generator described above, the metrics manager also includes a compute resource metrics generator 508. The compute resource metrics generator 508 may calculate performance metrics for one or more applications running on resources of the provider network (e.g., applications that are used by one or more internal and/or external clients of the provider network).

In some embodiments, some or all of the compute resource metrics generated by the compute metrics generator 508*a* and/or the latency metrics for the local replica generated by the latency metrics generator 114*a* (e.g., replica 110*a*) may be submitted to the log-first distributed database (e.g., the transaction log 116) and applied by one or more (or all) of the write appliers 108 of each of the instance hosts 506. Therefore, in embodiments, one or more of the instances 504 and/or the metrics managers 112 may have access to any of the metrics that are generated by any of the instance hosts (including its own host). Thus, each of the instances may have the ability to determine the health of any of the instances and to generate health alerts for instances with associated latencies that are above an acceptable threshold (or instances that stop reporting latencies for a threshold period of time), without having to calculate the metrics for other hosts.

In embodiments, a compute service 510 may execute one or more applications 512 for one or more clients using a respective group of compute resources 514 (e.g., hardware and/or software such as servers, compute instances, data storage resources, etc.). The metrics generator may obtain compute resource usage data for an application and generate performance metrics based on the data. For example, the metrics generator may obtain compute resource usage data for the application 512*a* and calculating one or more performance metrics associated with the application 512*a* based on the usage data for the resources 514*a*.

In various embodiments, the alarm service instance 504 may determine that a value for the performance metric is below a threshold value (e.g., below an acceptable CPU utilization, memory utilization, network utilization) or above a threshold value (e.g., above an acceptable failure rate). In response, the instance may generate a notification of the performance metric and it to a client. The client may then take actions to address the issue. In embodiments, the instance may initiate scaling of the resources of the provider network (e.g., add more servers and/or compute instances for use by the application).

By using a metrics manager to monitor both client application metrics as well as metrics for the alarm service itself, the alarm service may provide visibility for clients and/or administrator for not only application performance, but the performance of the alarm service itself (e.g., via alert notifications). Therefore, clients and/or administrators may be informed of performance issues before they significantly impact clients and appropriate actions may be taken (e.g., replacing and/or scaling instance hosts, database replicas, etc.) to prevent downtime and/or service interruptions.

Figure 6:
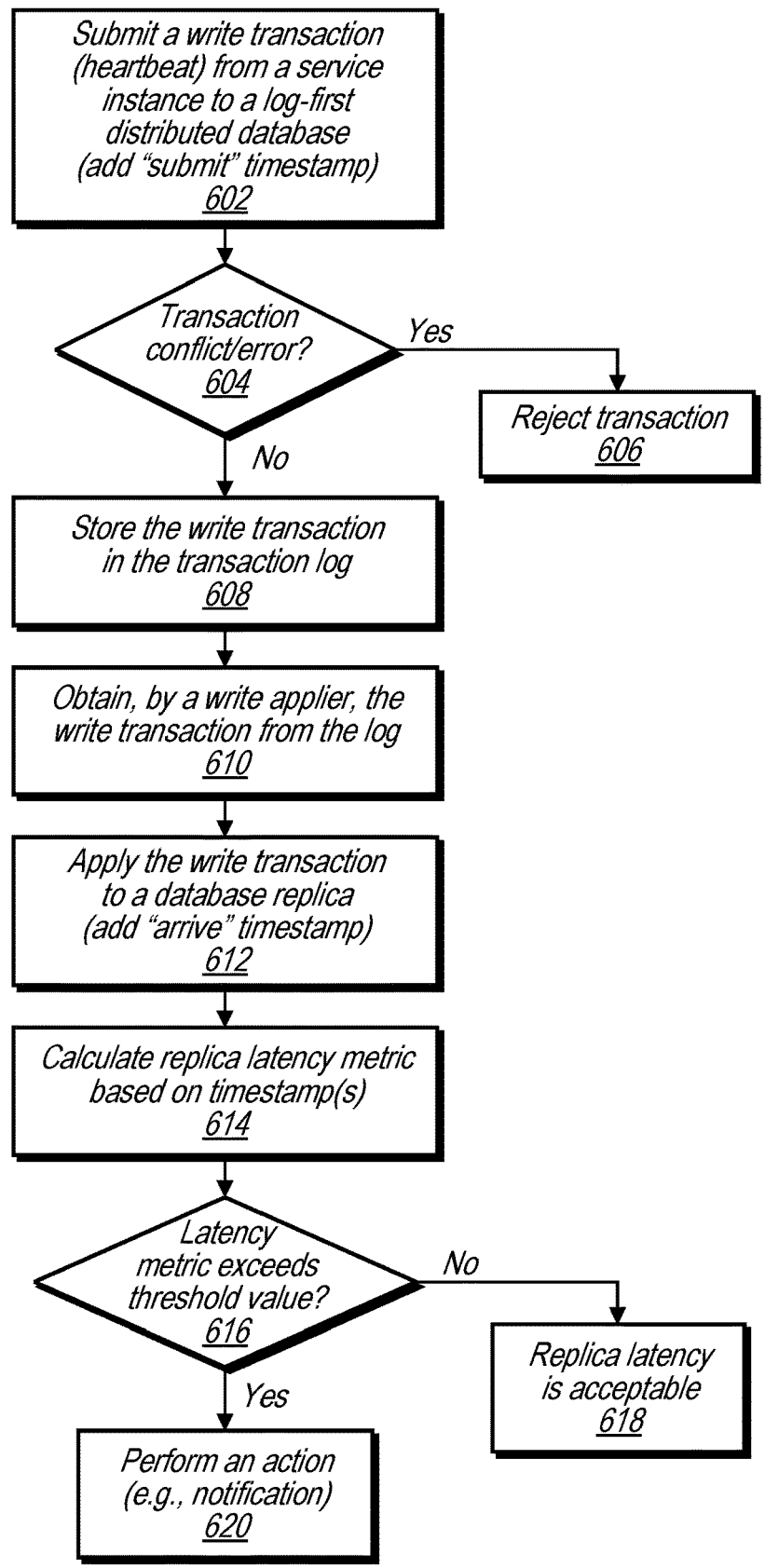
FIG. 6 is a flow diagram that illustrates determining replica performance for a transaction submitted by a service instance to a log-first distributed database, according to some embodiments.
Figure 7:
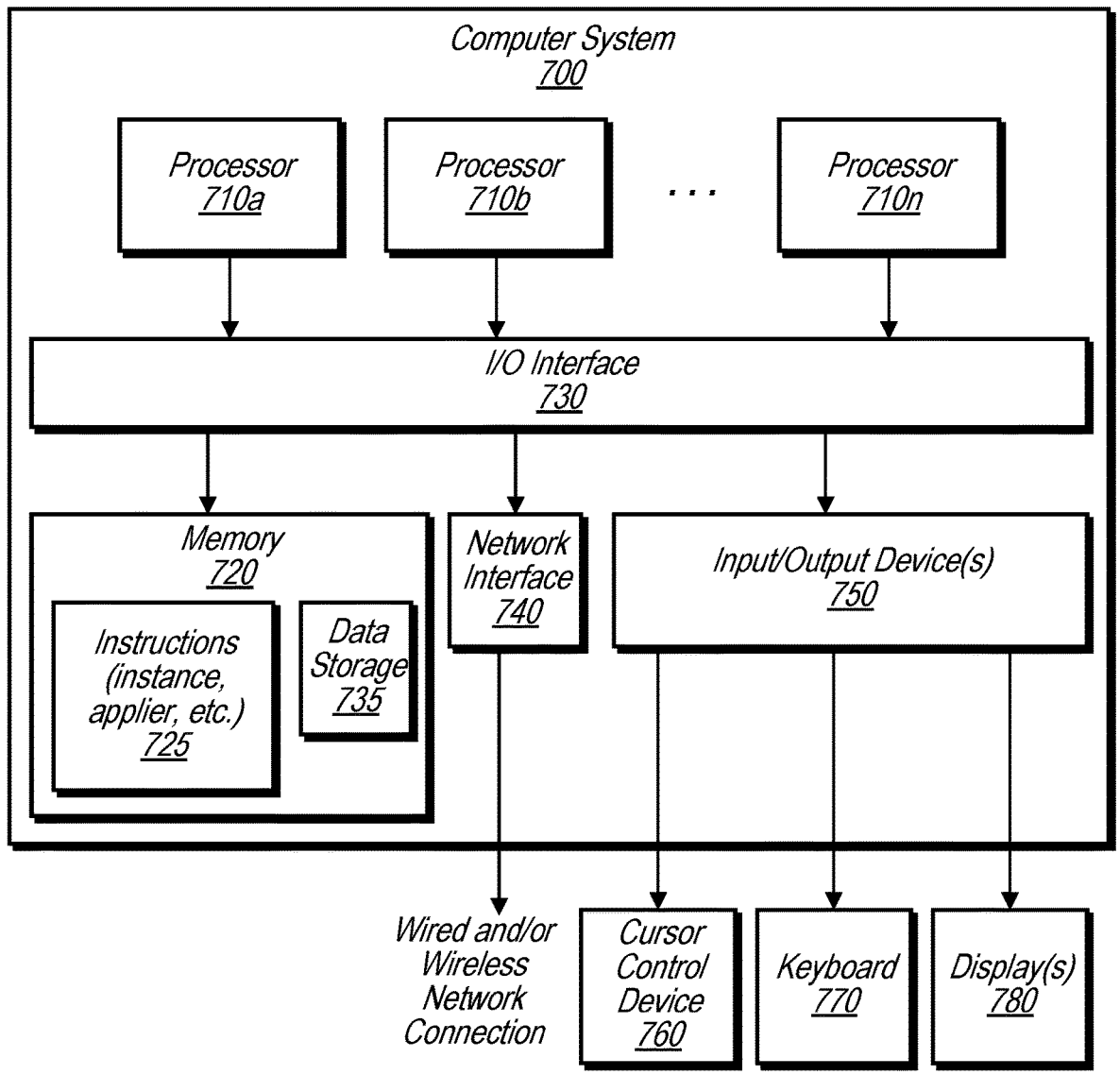
FIG. 7 is a block diagram illustrating an example computer system that implements some or all of the techniques described herein, according to some embodiments.

FIG. 6 is a flow diagram that illustrates determining replica performance for a transaction submitted by a service instance to a log-first distributed database, according to some embodiments. At block 602, a service instance submits a write transaction (e.g., a heartbeat test transaction) to a log-first distributed database. The transaction may include a submit timestamp.

At block 604, a conflict detector of the log-first distributed database determines if there are conflicts and/or errors associated with the transaction. If so, then at block 606, the log-first distributed database may reject the transaction. A notification of the rejection may be stored by the log-first distributed database and/or sent to the service instance.

At block 608, the log-first distributed database stores the transaction in the transaction log. As described above, in some embodiments the transaction may be replicated to one or more nodes before the transaction is committed. At block 610, a write applier obtains the write transaction from the transaction log and at block 612, the write applier applies the write transaction to a database replica. An arrive timestamp may be added to the transaction before and/or after the transaction is applied to the replica (e.g., by a database trigger).

At block 614, a metrics manager obtains the data for the transaction from the replica (e.g., by reading a row that stores the transaction data) and calculates a replica latency metric based on one or more timestamps obtained from the replica (e.g., the submit timestamp). At block 616, if the latency metric does not exceed a threshold value, then at block 618, the metric manager determines that the latency is acceptable. However, if the latency does exceed a threshold value, then at block 620, the metrics manager performs a responsive action. For example, the metrics manager may send a notification to a client and/or an administrator of the service or the metrics manager may replace and/or scale one or more resources.

Any of various computer systems may be configured to implement processes associated with the hosts, the log-first distributed database, service instances, other services of the provider network, clients, or any other component of the above figures. For example, FIG. 7 is a block diagram illustrating an example computer system that implements some or all of the techniques described herein, according to some embodiments.

In various embodiments, the hosts, the log-first distributed database, service instances, other services of the provider network, clients, or any other component of any of FIGS. 1-6 may each include one or more computer systems 700 such as that illustrated in FIG. 7. In embodiments, the data transport service, other services of the provider network, computing infrastructure collections, clients, or any other component may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for the hosts, log-first distributed database, services instances, applications, etc.), are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example.

In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 770 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the hosts, log-first distributed database, services instances, applications, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a plurality of computing devices of a provider network configured to implement a log-first distributed database comprising a transaction log and a plurality of database replicas;
a plurality of instance hosts respectively configured to implement instances of a service, wherein individual ones of the service instances are configured to:
submit, to the log-first distributed database, a sequence of write transactions that respectively indicate an identifier and a timestamp that indicates a time for the submission of the write transaction by the service instance to the log-first distributed database,
wherein the log-first distributed database is configured to, for individual ones of the write transactions submitted by the service instance:
store, in the transaction log, the write transaction;
obtain, from the transaction log by a write applier, the write transaction; and
apply, by the write applier, the write transaction to one of the database replicas associated with the write applier, wherein the database replica stores a record that indicates the identifier, the timestamp that indicates the time for the submission of the write transaction by the service instance to the log-first distributed database, and another timestamp that indicates a time for the application of the write transaction to the database replica; and
one or more processors configured to implement one or more metrics managers, wherein at least one of the metrics managers is configured to, for the individual ones of the write transactions submitted by the service instance:

obtain, based on the identifier, one or more of the timestamp or the other timestamp from the database replica;

calculate a latency metric associated with the database replica and the transaction log based on one or more of the timestamp or the other timestamp; and store the latency metric or transmit the latency metric to an endpoint.

2. The system as recited in claim 1, wherein to calculate the latency metric for the individual ones of the write transactions, the at least one metrics manager is configured to:

calculate a difference between the time indicated by the other timestamp and the time indicated by the timestamp.

3. The system as recited in claim 2, wherein the at least one metrics manager is configured to:

determine that the latency metric for one or more of the write transactions exceeds a threshold value; and in response to the determination, transmit to another endpoint an indication that the latency metric for the one or more write transactions exceeds the threshold value.

4. The system as recited in claim 1, wherein at least one of the plurality of instance hosts implements:

a particular one of the service instances;

a particular write applier associated with the particular service instance; and a particular database replica associated with the write applier.

5. The system as recited in claim 4, wherein the particular service instance implements a particular one of the metrics managers.

6. A method, comprising:

performing, by a plurality of computing devices:

for individual ones of a sequence of write transactions submitted by a service instance to a log-first distributed database:

storing, in a transaction log of the log-first distributed database, the write transaction, wherein the write transaction indicates a timestamp, wherein the timestamp indicates a time for the submission of the write transaction by the service instance to the log-first distributed database;

obtaining, from the transaction log by a write applier, the write transaction; and applying, by the write applier, the write transaction to a database replica associated with the write applier, wherein the database replica stores a record that indicates the timestamp indicating the time for the submission of the write transaction by the service instance to the log-first distributed database;

obtaining, by a metrics manager, the timestamp from the database replica;

calculating, by the metrics manager, a latency metric for the log-first distributed database based on the timestamp; and storing, by the metrics manager, the latency metric or transmitting, by the metrics manager, the latency metric to an endpoint.

7. The method as recited in claim 6, wherein calculating the latency metric comprises:

calculating a difference between a current time and the time for the submission of the write transaction indicated by the timestamp.

8. The method as recited in claim 6, wherein the stored record further indicates another timestamp that indicates a time for the application of the write transaction to the database replica, and wherein the method further comprises:

obtaining, by the metrics manager, the other timestamp from the database replica; and wherein the calculating further comprises:

calculating, by the metrics manager, a difference between the time indicated by the other timestamp and the time indicated by the timestamp.

9. The method as recited in claim 6, wherein the write applier and the database replica are hosted by a particular host computing device, and wherein one or more of the service instance or the metrics manager are respectively hosted on different host computing devices other than the particular host computing device.

10. The method as recited in claim 6, wherein the service instance is one of a plurality of service instances of a service that are respectively hosted by instance hosts, and further comprising:

obtaining, from the transaction log by the write applier, another write transaction submitted to the log-first distributed database by another of the service instances hosted by a different host than a host hosting the service instance; and applying, by the write applier, the other write transaction to the database replica associated with the write applier, wherein the database replica stores an additional timestamp that indicates a time for submission of the other write transaction by the other service instance, and wherein a time indicated by the additional timestamp is changed to account for a difference between a clock used by the host and a clock used by the different host.

11. The method as recited in claim 10, further comprising:

obtaining, by the metrics manager, at least the additional timestamp from the database replica;

calculating, by the metrics manager, another latency metric for the log-first distributed database based on the additional timestamp; and storing, by the metrics manager, the other latency metric or transmitting, by the metrics manager, the other latency metric to an endpoint.

12. The method as recited in claim 6, wherein the service instance implements the metrics manager, and wherein the service instance is one of a plurality of service instances of a service that are respectively hosted by instance hosts of a provider network.

13. The method as recited in claim 12, further comprising:

receiving, by the service instance, usage data for resources of the provider network that implement an application for a client of the provider network;

calculating, by the service instance, a performance metric associated with the application based on the usage data for the resources;

determining, by the service instance, that a value for the performance metric is below or above a threshold value; and in response to the determination, generate a notification associated with the performance metric or initiate scaling of the resources of the provider network.

14. The method as recited in claim 6, further comprising:

determine, by the log-first distributed database, whether the submitted transaction conflicts with other transactions stored by the transaction log; and in response to determining that the submitted transaction does not conflict with other transactions stored by the transaction log, store the write transaction in the transaction log.

15. One or more non-transitory computer-accessible storage media storing program instructions that when executed on or across one or more processors cause the one or more processors to implement a metrics manager to:
for individual ones of a sequence of write transactions submitted by a service instance to a log-first distributed database and stored in a transaction log of the log-first distributed database:
obtain, from a record of a database replica, one or more of a timestamp and another timestamp associated with the write transaction,
wherein the timestamp indicates a time for the submission of the write transaction by the service instance to the log-first distributed database, and
wherein the other timestamp indicates a time for application, by a write applier, of the write transaction to the database replica subsequent to an obtaining, by the write applier, of the write transaction from the transaction log;
calculate a latency metric associated with the database replica and the transaction log based on one or more of the timestamp or the other timestamp; and
store the latency metric or transmit the latency metric to an endpoint.

16. The one or more storage media as recited in claim 15, wherein to calculate the latency metric, the program instructions when executed on or across the one or more processors cause the one or more processors to:
calculate a difference between a current time and the time for the submission of the write transaction indicated by the timestamp.

17. The one or more storage media as recited in claim 15, wherein to calculate the latency metric, the program instructions when executed on or across the one or more processors cause the one or more processors to:
calculate a difference between the time indicated by the other timestamp and the time indicated by the timestamp.

18. The one or more storage media as recited in claim 15, further comprising program instructions that when executed on or across the one or more processors further cause the one or more processors to:
determine that the latency metric exceeds a threshold value; and
in response to the determination, transmit to another endpoint an indication that the latency metric exceeds the threshold value.

19. The one or more storage media as recited in claim 15, wherein the service instance is one of a plurality of service instances of a service that are respectively hosted by instance hosts, and further comprising program instructions that when executed on or across the one or more processors further cause the one or more processors to:
for individual ones of a sequence of other write transactions submitted by other service instances to the log-first distributed database and stored in the transaction log of the log-first distributed database:
obtain, from the database replica, an additional timestamp associated with the other write transaction,
wherein the additional timestamp indicates a time for the submission of the other write transaction by the other service instance; and
calculate, based on the additional timestamp for the other write transaction:
another latency metric associated with the transaction log, or
a number of the instance hosts that are healthy.

20. The one or more storage media as recited in claim 19, wherein the database replica is one of a plurality of database replicas that are respectively hosted by instance hosts, and further comprising program instructions that when executed on or across the one or more processors further cause the one or more processors to:
obtain one or more other latency metrics associated with one or more other respective database replicas and the transaction log;
compare the latency metric to the one or more other latency metrics;
determine, based on the comparison, that the latency metric associated with the database replica exceeds an acceptable threshold latency; and
in response to the determination, transmit to another endpoint an indication that the latency metric associated with the database replica exceeds the acceptable threshold latency.

\* \* \* \* \*